United States Patent
Kubotani et al.

(10) Patent No.: US 8,862,303 B2
(45) Date of Patent: Oct. 14, 2014

(54) INDUSTRIAL VEHICLE

(71) Applicant: Kabushiki Kaisha Toyota Jidoshokki, Kariya (JP)

(72) Inventors: Takehiro Kubotani, Aichi-ken (JP); Norihiko Kato, Aichi-ken (JP); Hitoshi Fukuoka, Aichi-ken (JP)

(73) Assignee: Kabushiki Kaisha Toshiba, Kariya-shi (JP)

( * ) Notice: Subject to any disclaimer, the term of this patent is extended or adjusted under 35 U.S.C. 154(b) by 0 days.

(21) Appl. No.: 13/928,762

(22) Filed: Jun. 27, 2013

(65) Prior Publication Data
US 2014/0005869 A1  Jan. 2, 2014

(30) Foreign Application Priority Data
Jun. 29, 2012  (JP) .................. 2012-146937

(51) Int. Cl.
*B60L 11/00*   (2006.01)
*B60L 15/20*   (2006.01)

(52) U.S. Cl.
CPC ..................... *B60L 15/20* (2013.01)
USPC ......................................... 701/22

(58) Field of Classification Search
None
See application file for complete search history.

(56) References Cited

U.S. PATENT DOCUMENTS 5,638,387 A *  6/1997  Palleggi et al. ............... 318/67
5,941,614 A    8/1999  Gallery et al.

FOREIGN PATENT DOCUMENTS

JP  08-256401 A  10/1996
JP  10-507145 A  7/1998

* cited by examiner

*Primary Examiner* — Thomas Tarcza
*Assistant Examiner* — Garrett Evans
(74) *Attorney, Agent, or Firm* — Sughrue Mion, PLLC

(57) ABSTRACT

An industrial vehicle has a vehicle travel mode including a vehicle speed control mode. The industrial vehicle includes an acceleration control member, a target vehicle speed calculator, a direction indicating member, a vehicle direction calculator, a vehicle speed calculator and a controller. The target vehicle speed calculator calculates a target vehicle speed based on an operation amount of the accelerator control member. The vehicle direction calculator calculates an instructing travel direction of the industrial vehicle based on a position of the direction indicating member. The vehicle speed calculator calculates an actual vehicle speed of the industrial vehicle. In the vehicle speed control mode, when the instructing travel direction is the same as an actual travel direction of the industrial vehicle and the target vehicle speed is lower than the actual vehicle speed, the controller maintains the vehicle travel mode in the vehicle speed control mode for controlling the traveling.

5 Claims, 6 Drawing Sheets

US 8,862,303 B2

INDUSTRIAL VEHICLE

BACKGROUND OF THE INVENTION

The present invention relates to an industrial vehicle.

Japanese Patent Application Publication No. 8-256401 discloses a forklift truck in which the target vehicle speed is calculated based on the operation amount of the accelerator pedal for controlling the actual vehicle speed. According to the above-cited Publication, in the state of a vehicle where the accelerator pedal is not operated by the vehicle driver and the actual vehicle speed is higher than a predetermined vehicle speed by a predetermined amount, the traction motor is braked by regenerative braking torque the magnitude of which is calculated from the difference between the actual vehicle speed and the predetermined vehicle speed. This regenerative braking is performed when the vehicle speed is increased to more than the predetermined value while the forklift truck is traveling down a slope.

When the target vehicle speed is determined based on the operation amount of the accelerator pedal, the forklift truck may be driven at a speed which varies according to the operation amount of the accelerator pedal. However, in a case that a predetermined limit vehicle speed is established so that the forklift truck travels down a slope at an actual vehicle speed which is lower than the predetermined limit vehicle speed, if the accelerator pedal is operated for instructing the target vehicle speed which is lower than the current target vehicle speed, the actual vehicle speed of the forklift truck may be reduced to the target vehicle speed.

The present invention is directed to providing an industrial vehicle having a travel control which allows the vehicle to travel in a manner that reflects the operation of the accelerator pedal.

SUMMARY OF THE INVENTION

In accordance with the present invention, an industrial vehicle has a vehicle travel mode including a vehicle speed control mode in which a predetermined limit vehicle speed that is lower than the maximum vehicle speed of the industrial vehicle is set and the industrial vehicle is controlled so as to travel at an actual vehicle speed that is lower than the predetermined limit vehicle speed. The industrial vehicle includes an acceleration control member, a target vehicle speed calculator, a direction indicating member, a vehicle direction calculator, a vehicle speed calculator and a controller. The acceleration control member is operated by a vehicle driver for controlling acceleration of the industrial vehicle. The target vehicle speed calculator calculates a target vehicle speed of the industrial vehicle based on an operation amount of the accelerator control member. The direction indicating member is operated by the vehicle driver for controlling a travel direction of the industrial vehicle. The vehicle direction calculator calculates an instructing travel direction of the industrial vehicle based on a position of the direction indicating member. The vehicle speed calculator calculates an actual vehicle speed of the industrial vehicle. The controller controls traveling of the industrial vehicle. In the vehicle speed control mode, when the instructing travel direction is the same as an actual travel direction of the industrial vehicle and the target vehicle speed is lower than the actual vehicle speed, the controller maintains the vehicle travel mode in the vehicle speed control mode for controlling the traveling of the industrial vehicle.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENT

Figure 1:
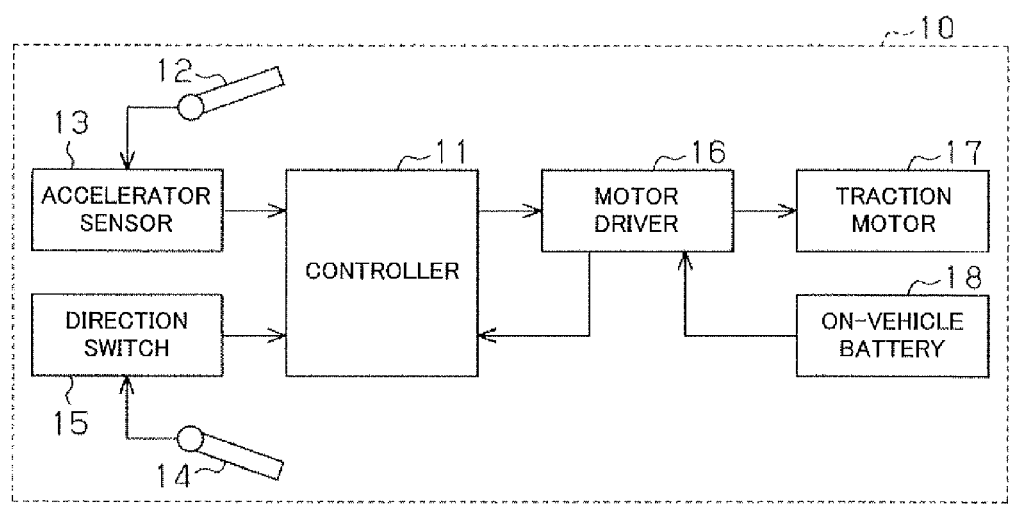
FIG. 1 is a block diagram showing an electrical arrangement of a forklift truck according to a preferred embodiment of the present invention.

The following will describe an industrial vehicle according to a preferred embodiment with reference to FIGS. 1 through 6. Referring to FIG. 1, reference numeral 10 designates a forklift truck as an industrial vehicle and the forklift truck 10 includes a controller 11. The forklift truck 10 has an accelerator pedal 12 which is operated by a vehicle driver for controlling the acceleration of the forklift truck 10. An accelerator sensor 13 is connected to the accelerator pedal 12 for detecting the amount of operation of the accelerator pedal 12. The accelerator sensor 13 is also connected to the controller 11 for generating to the controller 11 signals that are indicative of the detected operation amount of the accelerator pedal 12. The accelerator pedal 12 serves as an acceleration control member. The controller 11 which serves as a target vehicle speed calculator calculates a target vehicle speed based on the operation amount of the accelerator pedal 12. The forklift truck 10 has a direction control lever 14 which is operated by the vehicle driver for controlling the vehicle travel direction. A direction control switch 15 is connected to the direction control lever 14 for detecting the operated position of the direction control lever 14. The direction control switch 15 is also connected to the controller 11 for generating to the controller 11 signals that are indicative of the detected position of the direction control lever 14. The direction control lever 14 serves as a direction indicating member. The controller 11 which serves also as a vehicle direction calculator calculates the indicating travel direction of the forklift truck 10 based on the detected position of the direction control lever 14.

A traction motor 17 is connected to the controller 11 through a motor driver 16 for providing traction torque to the forklift truck 10. Electric power of an on-vehicle battery 18 is supplied to the traction motor 17 through the motor driver 16. Thus, the forklift truck 10 of this preferred embodiment is of a battery type or an electric type which is driven by the power of the traction motor 17.

The controller 11 sends to the motor driver 16 various command signals, for example, for acceleration, deceleration and motor speed. Receiving signals from the controller 11, the motor driver 16 drives the traction motor 17. The motor driver 16 sends to the controller 11 various signals such as a signal indicating the actual rotation speed of the traction motor 17. The controller 11 serves also as a vehicle speed calculator and calculates the actual vehicle speed of the forklift truck 10 from the actual rotation speed of the traction motor 17. The controller 11 calculates the actual travel direction in which the forklift truck 10 actually travels based on the actual rotation speed of the traction motor 17.

Figure 2:
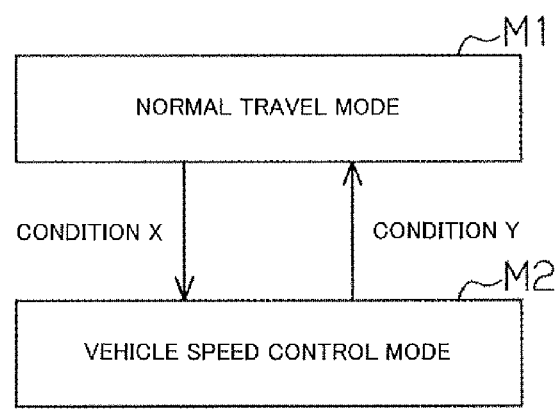
FIG. 2 is a schematic diagram showing travel control modes of the forklift truck of FIG. 1.

The controller 11 which also serves as a controller selects either one of the travel control modes shown in FIG. 2, namely the normal travel mode M1 and the vehicle speed control mode M2, and controls the traveling of the forklift truck 10 depending on the traveling condition of the selected travel control mode of the forklift truck 10. If the forklift truck 10 in the normal travel mode M1 is under a condition X, the controller 11 shifts the travel control mode from the normal travel mode M1 to the vehicle speed control mode M2. If the forklift truck 10 in the vehicle speed control mode M2 is under a condition Y, the controller 11 shifts the travel control mode from the vehicle speed control mode M2 to the normal travel mode M1. In the normal travel mode M1, the forklift truck 10 is driven at a speed which is changed according to the accelerator position of the accelerator pedal 12 operated by a vehicle driver. In the normal travel mode M1, power running operation and regenerative braking operation of the traction motor 17 are allowed. In the vehicle speed control mode M2, on the other hand, the forklift truck 10 is driven by any external force other than the traction motor 17 without operation of the accelerator pedal 12 by the vehicle driver. The external force applied to the forklift truck 10 includes gravity exerted to the forklift truck 10 moving on a slope. In the vehicle speed control mode M2, a predetermined limit vehicle speed is set and the forklift truck 10 is controlled so as to travel at a speed that is lower than the predetermined limit vehicle speed. The predetermined limit vehicle speed is lower than the maximum vehicle speed of the forklift truck 10, for example set in the range of 2 to 4 km/h. In the vehicle speed control mode M2, the regenerative braking operation of the traction motor 17 is allowed and used for controlling the vehicle speed which is lower than the predetermined limit vehicle speed.

Figure 3:
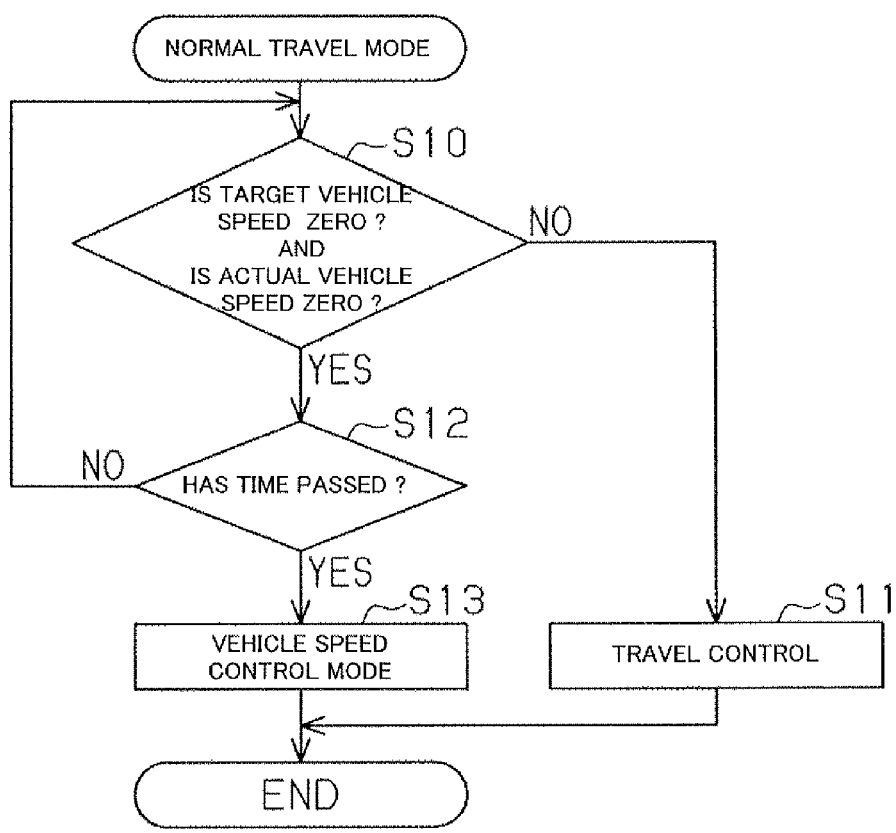
FIG. 3 is a flow chart showing a manner of controlling in the normal travel mode of the forklift truck of FIG. 1.

The following will describe in detail the controlling of the controller 11 in the vehicle speed control mode M2. Referring to FIG. 3, the controller 11 determines at step S10 whether or not the target vehicle speed is zero and the actual vehicle speed is also zero in the normal travel mode M1. In other words, it is determined at step S10 whether or not the vehicle driver has an intension of stopping the forklift truck 10 and the forklift truck 10 is actually at a stop. In the case that the target vehicle speed is zero, the accelerator pedal 12 is not operated, or the accelerator pedal 12 is operated only for an extremely small operation amount. Extremely small operation amount of the accelerator pedal 12 means that the accelerator pedal 12 is positioned within a predetermined neutral range, i.e. 0 to γ shown in FIGS. 5 and 6.

If NO at step S10, or the target vehicle speed is higher than zero or the actual vehicle speed is higher than zero, the controller 11 controls the forklift truck 10 to travel at the target vehicle speed depending on the accelerator position of the accelerator pedal 12 at step S11. If YES at step S10, or the target vehicle speed and the actual vehicle speed are zero, the controller 11 determines at step S12 whether or not a predetermined time has passed after the target vehicle speed is zero. If NO at step S12, the procedure returns to step S10. If YES at step S12, the controller 11 controls at step S13 so that the travel control mode is shifted from the normal travel mode M1 to the vehicle speed control mode M2. According to this preferred embodiment of the present invention, the condition X that shifts the travel control mode from the normal travel mode M1 to the vehicle speed control mode M2 is fulfilled by the affirmation at steps S10 and S12, or the target vehicle speed being zero, the actual vehicle speed being zero and the predetermined time having passed as described above. According to the controlling of FIG. 3, when the accelerator pedal 12 is not operated while the forklift truck 10 travels down a slope, the forklift truck 10 is stopped completely, then the vehicle travel mode is shifted to the vehicle speed control mode M2 and the forklift truck 10 is allowed to travel down a slope.

Figure 4:
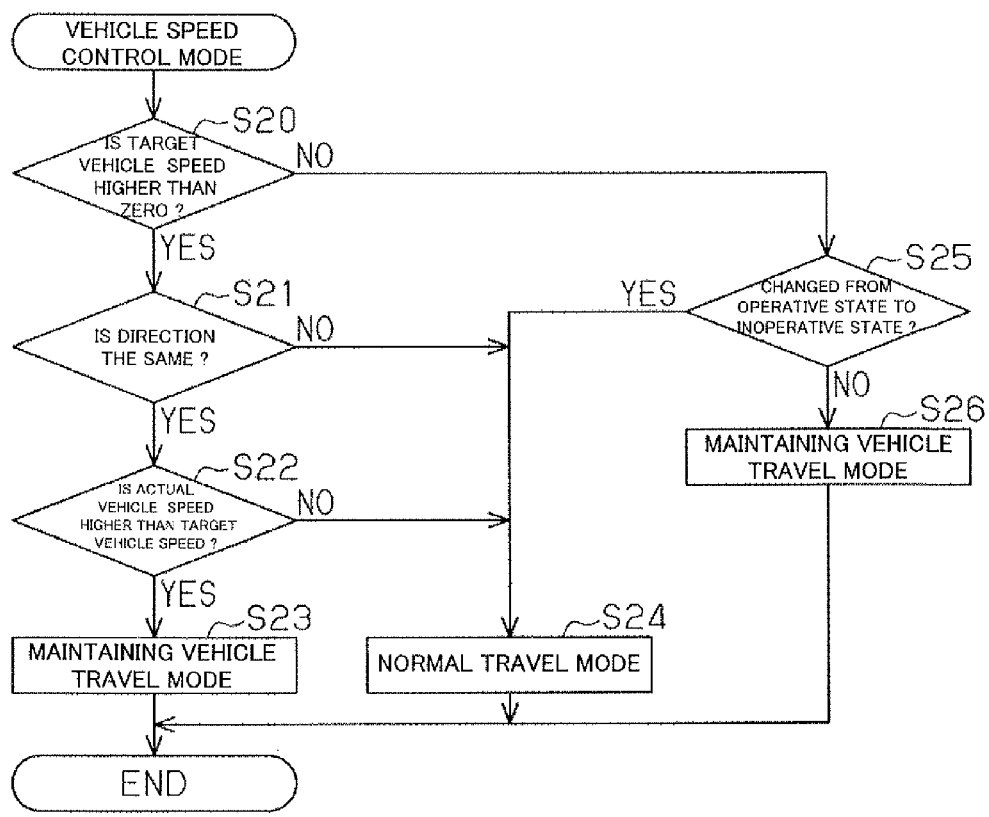
FIG. 4 is a flow chart showing a manner of controlling in the vehicle speed control mode of the forklift truck of FIG. 1.

Referring to FIG. 4, the controller 11 determines at step S20 whether or not the target vehicle speed is higher than zero in the vehicle speed control mode M2. At step S20, it is determined whether or not the accelerator pedal 12 is operated by the vehicle driver in the vehicle speed control mode M2. If YES at step S20, or the target vehicle speed is higher than zero, the controller 11 then determines at step S21 whether or not the indicating travel direction of the forklift truck 10 is the same as the actual travel direction. If YES at step S21, the controller 11 compares at step S22 the target vehicle speed with the actual vehicle speed and determines whether or not the actual vehicle speed is higher than the target vehicle speed. If YES at step S22, the controller 11 maintains the vehicle travel mode in the vehicle speed control mode M2 and the traveling of the forklift truck 10 continues to be controlled in the vehicle speed control mode M2. If NO at step S21, the controller 11 stops the vehicle speed control mode M2 and shifts the travel control mode to the normal travel mode M1 at step S24. If NO at step S22, the controller 11 stops the vehicle speed control mode M2 and shifts the travel control mode to the normal travel mode M1 at step S24.

In the vehicle speed control mode M2, the regenerative braking operation of the traction motor 17 is allowed, while the power running operation of the traction motor 17 is prohibited. In other words, in the vehicle speed control mode M2, no traction torque is generated by the forklift truck 10. The controller 11 which serves as a calculator calculates the target vehicle speed when the accelerator pedal 12 is operated in the vehicle speed control mode M2 and obtains control data such as a calculated value of acceleration for achieving the target vehicle speed. The controller 11 which also serves as a reset device resets the calculation results of the control data in the vehicle speed control mode M2 when the travel control mode shifts to the normal travel mode M1 at step S24. The control data based on the calculation results of the control data in the vehicle speed control mode M2 is sent to the motor driver 16, but the motor driver 16 is prevented from driving the traction motor 17 based on the control data.

Returning to FIG. 4, if NO at step S20, the controller 11 determines at step S25 whether or not the state of the accelerator pedal 12 is changed from the operative state to the inoperative state. If YES at step S25, the controller 11 stops the vehicle speed control mode M2 and shifts the vehicle travel mode to the normal travel mode M1 at step S24. If NO at step S25, the controller 11 maintains the vehicle travel mode in the vehicle speed control mode M2 and the traveling of the forklift truck 10 continued to be controlled in the vehicle speed control mode M2.

According to the preferred embodiment of the present invention, the condition Y that shifts the vehicle travel mode from the vehicle speed control mode M2 to the normal travel mode M1 is fulfilled by the affirmation or YES at step S20 and the negation or NO at step S21, or the target vehicle speed is higher than zero and the indicating travel direction is not the same as the actual travel direction. Furthermore, the condition Y for shifting the vehicle travel mode from the vehicle speed control mode M2 to the normal travel mode M1 is fulfilled by the affirmation or YES at steps S20 and S21 and the negation or NO at step S22, or the target vehicle speed is higher than zero, the instructing travel direction is the same as the actual travel direction and the target vehicle speed is higher than the actual vehicle speed. Still furthermore, the condition Y is fulfilled by the negation or NO at step S20 and the affirmation or YES at step S25, or the target vehicle speed is zero and the state of the accelerator pedal 12 is changed from the operative state to the inoperative state.

According to the preferred embodiment of the present invention, the condition that maintains the vehicle travel mode in the vehicle speed control mode M2 is fulfilled by the affirmation or YES at steps S20, S21 and S22, or the target vehicle speed is higher than zero, the indicating travel direction is the same as the actual travel direction and the target vehicle speed is lower than the actual vehicle speed.

Figure 5:
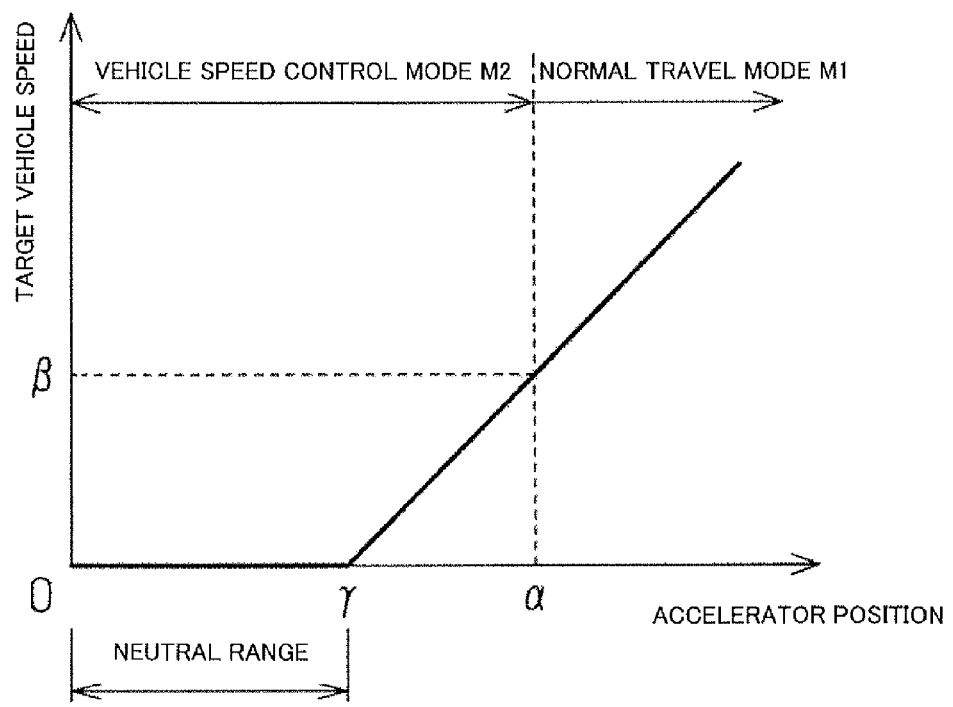
FIG. 5 is a timing chart showing the transitions of target vehicle speed and the position of an accelerator pedal of the forklift truck of FIG. 1 when an instructing travel direction is the same as the actual travel direction.
Figure 6:
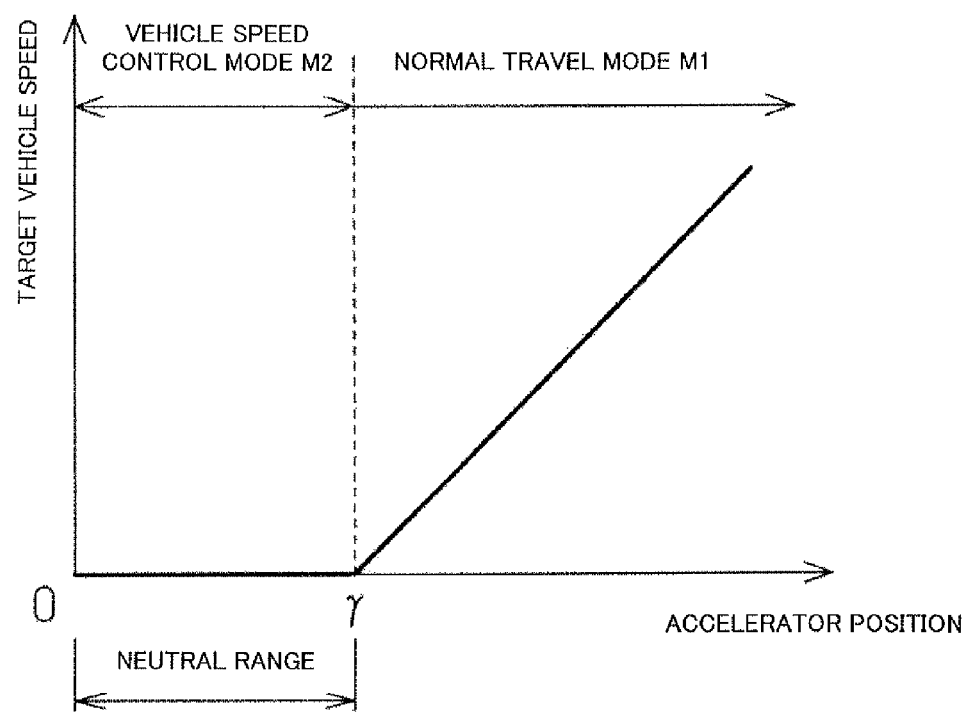
FIG. 6 is a timing chart showing the transitions of target vehicle speed and position of an accelerator pedal of the forklift truck of FIG. 1 when the instructing travel direction is different from the actual travel direction.

The following will describe the operation of the forklift truck 10 according to this preferred embodiment. Referring to FIG. 5, in the vehicle speed control mode M2, when the indicating travel direction is the same as the actual travel direction, the vehicle travel mode is maintained in the vehicle speed control mode M2 as long as the accelerator pedal 12 is operated to such an extent that the target vehicle speed is within the range that is below the actual vehicle speed. In FIG. 5, the accelerator position of the accelerator pedal 12 in the vehicle speed control mode M2 is indicated by symbol α and the corresponding target vehicle speed is indicated by symbol β. When the accelerator pedal 12 is operated to such an extent that the target vehicle speed is increased over the actual vehicle speed, the vehicle travel mode is shifted from the vehicle speed control mode M2 to the normal travel mode M1. Referring to FIG. 6, in the vehicle speed control mode M2, when the indicating travel direction is different from the actual travel direction, the vehicle travel mode is shifted from the vehicle speed control mode M2 to the normal travel mode M1 if the accelerator pedal 12 is operated to such an extent that the accelerator position of the accelerator pedal 12 is moved over the predetermined neutral range.

In such controlling of shifting between the normal travel mode M1 and the vehicle speed control mode M2, when the accelerator pedal 12 is operated while the forklift truck 10 is traveling down a slope at the limited vehicle speed, the traveling of the forklift truck 10 is controlled according to the vehicle driver's intention. When the vehicle driver operates the accelerator pedal 12 with the intention to travel down a slope, the vehicle travel mode is shifted from the vehicle speed control mode M2 to the normal travel mode M1 if the accelerator pedal 12 starts to be operated, so that the actual travel speed of the forklift truck 10 may be reduced. In the normal travel mode M1, the target vehicle speed is set according to the accelerator position of the accelerator pedal 12 for controlling the speed of the forklift truck 10 without restricting the vehicle speed. Therefore, when the accelerator position of the accelerator pedal 12 is changed a little to set the target vehicle speed to be lower than a speed which is the same as the predetermined limit vehicle speed, the forklift truck 10 travels at a speed corresponding the accelerator position of the accelerator pedal 12. Thus, in the vehicle speed control mode M2, when the accelerator position of the accelerator pedal 12 is changed a little, the vehicle travel mode is maintained in the vehicle speed control mode M2 such that the forklift truck 10 travels at a speed which is lower than the predetermined limit vehicle speed for controlling the traveling of the forklift truck 10 without reducing the actual vehicle speed as the vehicle driver's intention to travel down a slope.

Meanwhile, when the accelerator pedal 12 is operated for a large operation amount, it is considered that the vehicle driver intends to accelerate the forklift truck 10 while traveling down a slope. If the vehicle travel mode is then maintained in the vehicle speed control mode M2, the forklift truck 10 is not accelerated against the vehicle driver's intension. Thus, when the accelerator pedal 12 is operated for a large operation amount, the vehicle travel mode is shifted from the vehicle speed control mode M2 to the normal travel mode M1 and the forklift truck 10 is accelerated in accordance with the target vehicle speed depending on the accelerator position of the accelerator pedal 12.

Gravity acts on the forklift truck 10 on a slope and the forklift truck 10 tends to travel under the influence of the gravity without the operation of the accelerator pedal 12. In such a case, the forklift truck 10 may travel in a direction against the vehicle driver's intention. The forklift truck 10 instructed by the vehicle driver to travel forward up a slop may move backward down the slope due to gravity. Therefore, when the instructing travel direction of the forklift truck 10 is different from the actual travel direction, the vehicle travel mode is shifted from the vehicle speed control mode M2 to the normal travel mode M1 so that the forklift truck 10 is accelerated in accordance with the target vehicle speed depending on the accelerator position of the accelerator pedal 12, as shown in FIG. 6.

When the operation of the accelerator pedal 12 is stopped during the forklift truck operation in the vehicle speed control mode M2, it is considered that the vehicle driver intends to stop the forklift truck 10. In this case, the target vehicle speed is set according to the accelerator position of the accelerator pedal 12 so as to reflect the vehicle driver's intension and the vehicle travel mode is shifted from the vehicle speed control mode M2 to the normal travel mode M1, so that the forklift truck 10 is controlled to travel according to the target vehicle speed.

This preferred embodiment of the present invention offers the following advantageous effects.

(1) In the vehicle speed control mode M2, when the instructing travel direction is the same as the actual travel direction and the target vehicle speed is lower than the actual vehicle speed, the vehicle travel mode is maintained in the vehicle speed control mode M2 for controlling the traveling of the forklift truck 10. Thus, if the accelerator position of the accelerator pedal 12 is changed a little while the forklift truck 10 is moving down a slope, the forklift truck 10 travels at a limited vehicle speed in the vehicle speed control mode M2 without reducing the speed. Therefore, the traveling of the forklift truck 10 in the vehicle speed control mode M2 is controlled so as to reflect the operation of the accelerator pedal 12 by the vehicle driver.

(2) In the vehicle speed control mode M2, when the instructing travel direction is the same as the actual travel direction and the target vehicle speed is higher than the actual vehicle speed, the vehicle travel mode is shifted from the vehicle speed control mode M2 to the normal travel mode M1. Thus, when the accelerator pedal 12 is operated for a large amount while the forklift truck 10 is traveling down a slope, the traveling of the forklift truck 10 may be controlled so as to reflect the vehicle driver's intension.

(3) In the vehicle speed control mode M2, when the state of the accelerator pedal 12 is changed from the operative state to the inoperative state, the vehicle travel mode is shifted from the vehicle speed control mode M2 to the normal travel mode M1, so that the traveling of the forklift truck 10 may be controlled so as to reflect the vehicle driver's intention to stop the forklift truck 10.

(4) In the vehicle speed control mode M2, when the instructing travel direction is different from the actual travel direction, the vehicle travel mode is shifted from the vehicle speed control mode M2 to the normal travel mode M1 for controlling the traveling of the forklift truck 10. Thus, the vehicle driver may control the forklift truck 10 to travel in the direction in which the vehicle driver wants the forklift truck 10 to move while forklift truck 10 is traveling down a slope. Thus, the traveling of the forklift truck 10 may be controlled according to the vehicle driver's intension.

(5) When the vehicle travel mode is shifted from the vehicle speed control mode M2 to the normal travel mode M1, control data which is obtained through calculation by the controller 11 during the forklift truck operation in the vehicle speed control mode M2, such as calculation results of the control data for acceleration, is reset. Thus, the torque of the forklift truck 10 is prevented from being changed suddenly when the vehicle travel mode is shifted from the vehicle speed control mode M2 to the normal travel mode M1 due to the control data effective that is for the vehicle speed control mode M2. For example, the vehicle speed of the forklift truck 10 is prevented from being accelerated suddenly.

The present invention may be modified into various alternative embodiments as exemplified below.

In this preferred embodiment of the present invention, when the state of the accelerator pedal 12 is changed from the operative state to the inoperative state, the vehicle travel mode may be shifted from the normal travel mode M1 to the vehicle speed control mode M2. The predetermined limit vehicle speed in the vehicle speed control mode M2 may be set as the actual vehicle speed when the accelerator pedal 12 is changed to the inoperative state. According to this controlling, the actual vehicle speed in the vehicle speed control mode M2 after the change of the accelerator pedal 12 to its inoperative state corresponds to the actual vehicle speed in the normal travel mode M1 just before the shifting of the vehicle travel mode to the vehicle speed control mode M2 and the forklift truck 10 is controlled to travel at a speed that is below the actual vehicle speed which corresponds to the predetermined limit vehicle speed. Thus, the forklift truck 10 may be controlled to travel in the vehicle speed control mode M2 without previously setting the predetermined limit vehicle speed in the vehicle speed control mode M2. For example, the vehicle driver may determine the vehicle speed, which corresponds to the predetermined limit vehicle speed, while forklift truck 10 is traveling down a slope.

In this preferred embodiment of the present invention, when the accelerator pedal 12 is operated such that the target vehicle speed is below the actual vehicle speed, the value of the vehicle speed corresponding to the accelerator position of the accelerator pedal 12 may be added to the predetermined limit vehicle speed. According to this controlling, since the predetermined limit vehicle speed is made greater to increase the vehicle speed, the actual vehicle speed of the forklift truck 10 in the vehicle speed control mode M2 is increased.

In this preferred embodiment of the present invention, the acceleration control member and the direction indicating member may be changed in structure as required. The acceleration control member is not limited to a pedal, but it may be a grip or a lever. The operation of the acceleration control member and of the direction indicating member may be performed at the same time.

It is noted that the travel control according to this preferred embodiment may be applied to any other industrial vehicles other than the forklift truck 10.

In this preferred embodiment of the present invention, the control data used for increasing the vehicle speed to the target vehicle speed such as calculated value of acceleration need not be calculated in the vehicle speed control mode M2.

In a case that the travel control according to this preferred embodiment is applied to a hybrid industrial vehicle, calculation for the control data such as output power or balance of power generation and consumption may be performed. In this case, the calculation results of the control data may be reset as in the case of the preferred embodiment or, alternatively, the calculation may be omitted.

In this preferred embodiment of the present invention, the controller 11 may be configured to function as a vehicle speed offsetting device which offsets the actual vehicle speed to be compared with the target vehicle speed in the vehicle speed control mode M2 so as to increase or decrease the vehicle speed. If the actual vehicle speed is offset to decrease the vehicle speed so as to correspond to the accelerator position of the accelerator pedal 12, the vehicle travel mode may be shifted to the normal travel mode M1 while the vehicle speed of the forklift truck 10 is being reduced. Further, the vehicle travel mode may be controlled to shift to the normal travel mode M1 at an early stage. If the actual vehicle speed is offset to increase a vehicle speed, the vehicle travel mode may be controlled to shift to the normal travel mode while a difference between the actual vehicle speed and the target vehicle speed exists. Thus, the vehicle driver may feel acceleration. According to this controlling, increase or decrease of the vehicle speed of the forklift truck 10 may be adapted to the feeling of acceleration which is required to the vehicle.

What is claimed is:

1. An industrial vehicle having a vehicle travel mode including a vehicle speed control mode in which a predetermined limit vehicle speed that is lower than the maximum vehicle speed of the industrial vehicle is set and the industrial vehicle is controlled so as to travel at an actual vehicle speed that is lower than the predetermined limit vehicle speed, the industrial vehicle comprising:

an acceleration control member operated by a vehicle driver for controlling acceleration of the industrial vehicle;

a target vehicle speed calculator calculating a target vehicle speed of the industrial vehicle based on an operation amount of the acceleration control member;

a direction indicating member operated by the vehicle driver for controlling a travel direction of the industrial vehicle;

a vehicle direction calculator calculating an instructing travel direction of the industrial vehicle based on a position of the direction indicating member;

a vehicle speed calculator calculating an actual vehicle speed of the industrial vehicle; and a controller controlling traveling of the industrial vehicle, wherein, in the vehicle speed control mode, when the instructing travel direction is the same as an actual travel direction of the industrial vehicle and the target vehicle speed is lower than the actual vehicle speed, the controller maintains the vehicle travel mode in the vehicle speed control mode for controlling the traveling of the industrial vehicle, wherein, in the vehicle speed control mode, the industrial vehicle is driven by any external force without operation of the acceleration control member.

2. The industrial vehicle according to claim 1, wherein, in the vehicle speed control mode, when the instructing travel direction is the same as the actual travel direction and the target vehicle speed is higher than the actual vehicle speed, the controller stops the vehicle speed control mode and the industrial vehicle is controlled to travel according to the target vehicle speed.

3. The industrial vehicle according to claim 2, wherein, in the vehicle speed control mode, when a state of the acceleration control member is changed from an operative state to an inoperative state such that the target vehicle speed is lower than the actual vehicle speed, the controller stops the vehicle speed control mode.

4. The industrial vehicle according to claim 1, wherein, in the vehicle speed control mode, when the instructing travel direction is not the same as the actual travel direction, the controller stops the vehicle speed control mode and the industrial vehicle is controlled to travel according to the target vehicle speed.

5. The industrial vehicle according to claim 1, wherein the industrial vehicle includes a calculator calculating control data for achieving the target vehicle speed and a reset device resetting the calculation results of the control data when the controller stops the vehicle speed control mode.

\* \* \* \* \*